April 17, 1934.　　　　　R. GUNN　　　　　1,954,811
CONSTANT SPEED AIR MOTOR
Filed April 4, 1932　　　3 Sheets-Sheet 1
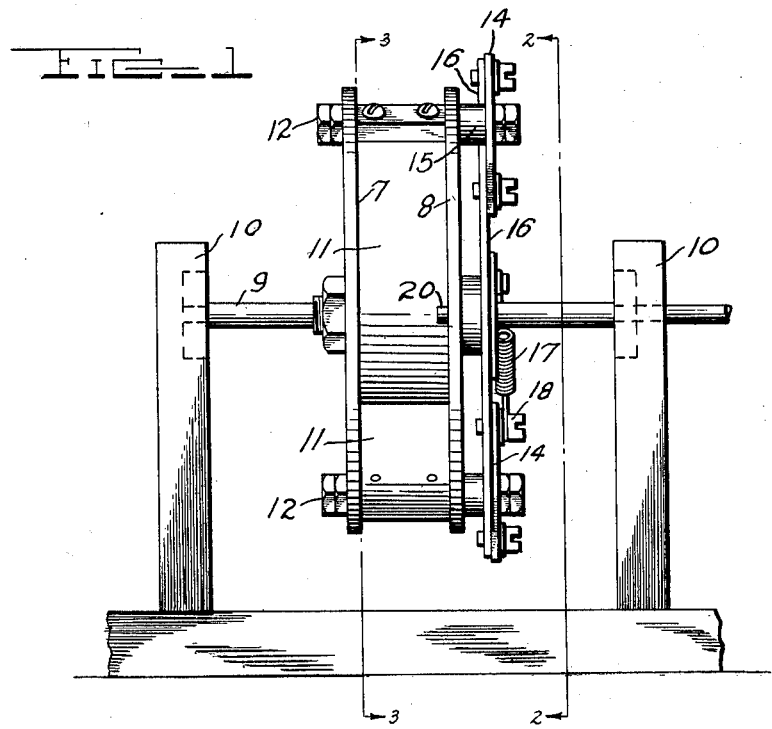
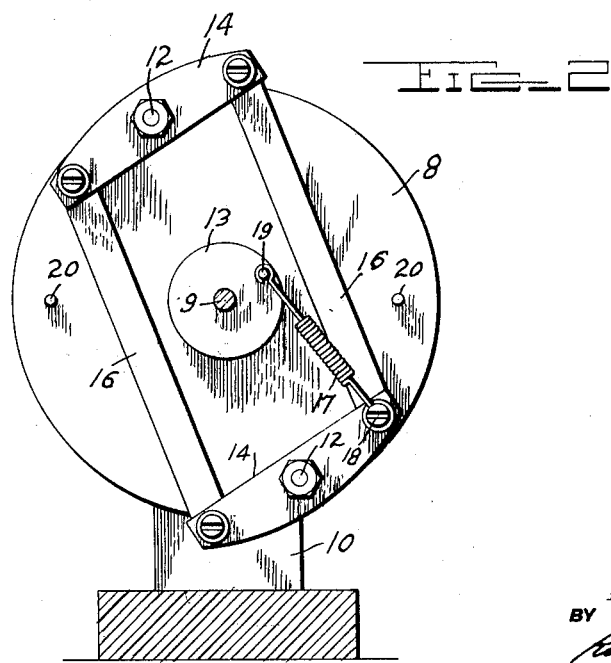
INVENTOR
Ross Gunn
BY
ATTORNEY April 17, 1934.  R. GUNN  1,954,811
CONSTANT SPEED AIR MOTOR
Filed April 4, 1932  3 Sheets-Sheet 2
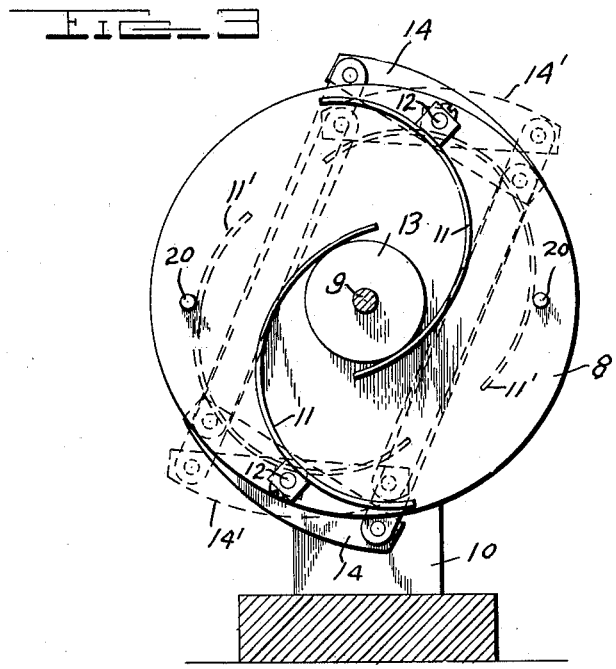
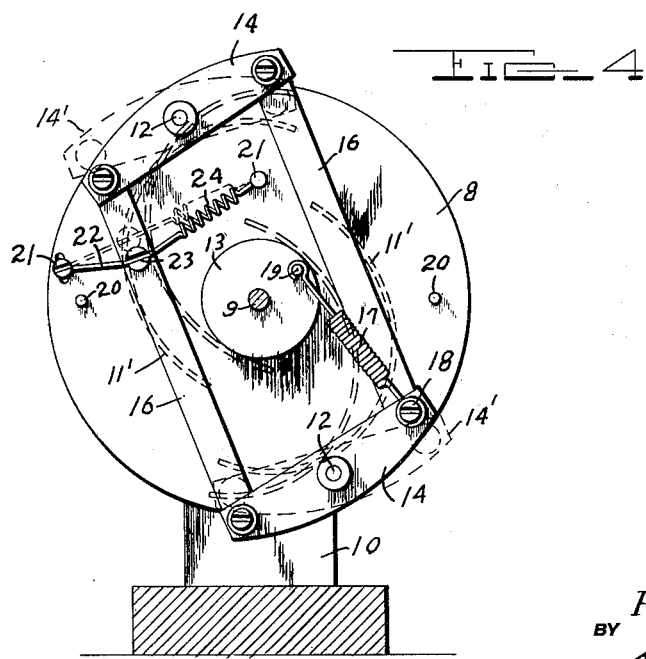
INVENTOR
Ross Gunn
BY
ATTORNEY April 17, 1934.   R. GUNN   1,954,811
CONSTANT SPEED AIR MOTOR
Filed April 4, 1932   3 Sheets-Sheet 3
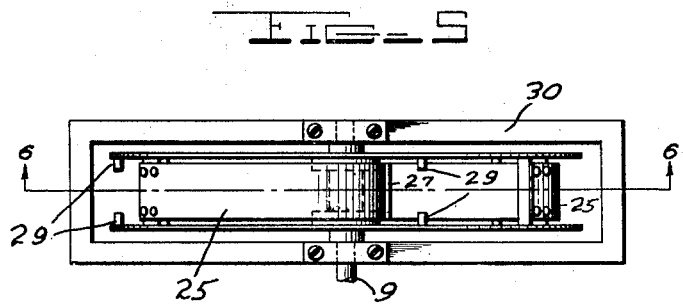
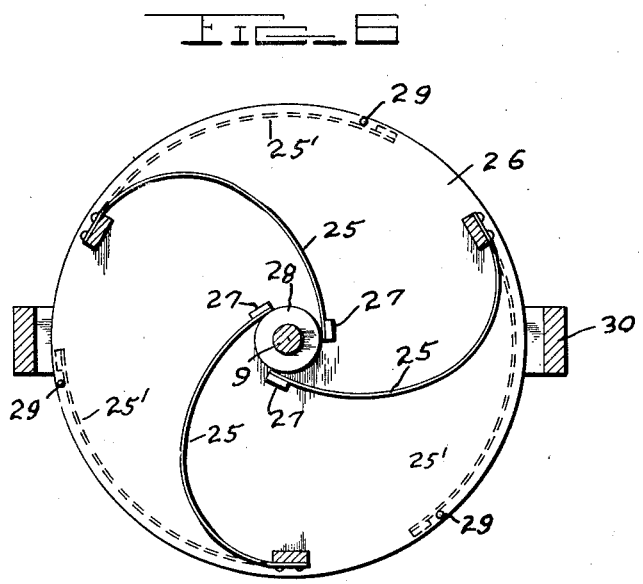
INVENTOR
Ross Gunn
BY
ATTORNEY Patented Apr. 17, 1934

1,954,811

UNITED STATES PATENT OFFICE 1,954,811

CONSTANT SPEED AIR MOTOR

Ross Gunn, Washington, D. C.

Application April 4, 1932, Serial No. 603,159

1 Claim. (Cl. 170—33)

(Granted under the act of March 3, 1883, as amended April 30, 1928; 370 O. G. 757)

This invention relates to an air motor so constructed as to run at substantially constant speed over a widely varying range of velocities of the actuating air currents and has for its object to provide a motor of the kind specified that can be operated by the air stream flowing past a moving vehicle, such as airplanes, etc., on which my motor may be mounted and will have a sufficiently uniform speed of operation to be suitable for driving earth inductor compasses, radio generators, etc.

With the above and other objects in view, the invention consists in the construction, combination and arrangement of parts as will be described more fully hereinafter.

In the drawings:

Fig. 1 is a peripheral view of one form of my invention;

Figs. 2 and 3 are cross sections taken on the lines 2—2 and 3—3, respectively, on Fig. 1;

Fig. 4 is a side elevation of a form of my invention having a modified type of control for the vanes;

Fig. 5 is a peripheral view of another embodiment of my invention;

Fig. 6 is a view taken on the line 6—6, Fig. 5.

It is well known practice to mount upon an aircraft a motor adapted to be driven by the stream of air flowing past the craft to operate an electric generator. The current derived from such generator must be steady, as it is used for operating the radio sets or other devices requiring a prime source of power on the craft. My motor is designed to run at constant speed, and hence to give a steady generator output at various air speeds. This is accomplished by changing the area of the vanes exposed to the air current and the incidence of the air on the vanes.

Discs 7 and 8 are mounted on shaft 9 that is journalled in standards 10. The discs are spaced apart a distance to accommodate vanes 11 of suitable width, the vanes being fixed intermediate their ends on studs 12 that are rotatably mounted in the discs 7 and 8. The vanes are curved and are mounted with their concave faces directed to receive the incident air stream, the material of which they are made being sufficiently rigid to maintain the arcuate shape. When the motor is not running or is rotating at relatively low speeds the radially inner ends of the vanes contact the spacing collar 13. Adjacent the outer face of disk 8 a yoke 14 is fixed on each of the studs 12, spaced from the disk by spacers 15. The ends of the yokes are pivotally connected together by links 16. Spring 17 has one end connected to pivot 18 and the other end attached to pin 19 on disk 8, the tension of the spring tending to hold the vanes with their inner ends in contact with collar 13. Stops 20 prevent the vanes from moving out too far.

When a stream of air strikes the vanes 11 the device is set in rotation which sets up a centrifugal force that moves the vanes outwardly, thereby diminishing the effective area of the vanes presented to the air stream. If the speed of rotation exceeds the desired magnitude, the vanes are thrown out farther and the propulsive effect is correspondingly diminished whereby the speed is controlled. The rate of rotation is governed by the spring 17, since the greater the tension therein the higher must be the speed to produce the centrifugal force to throw the vanes out to a given position.

A somewhat more satisfactory means of regulating the speed is shown in Fig. 4 wherein, in addition to the mechanism above described, there is an additional spring 24 provided with its ends attached to pins 21 on the disk and a deformed uncoiled portion 22 disposed in a slot in pin 23 carried by link 16, the spring 24 working against spring 17. This results in a more sensitive and better balanced motor than where but one spring is used, the vanes being stabilized at the critical speed. It will be observed that the vanes are constrained to move in unison, due to the coupling by yokes 14 and links 16. The positions of the vanes and of the several parts connected therewith are shown in dotted lines indicated by the same reference numerals as previously used but distinguished therefrom by the addition of the prime sign.

The form of the invention shown in Figs. 5 and 6 differs from the one above described in that the vanes 25, which are resilient and are attached at their outer ends to the discs 26 have each a weight 27 attached to their movable ends. When the motor is not operating the movable ends contact the spacing collar 28, but increasing speed of rotation throws them outwardly, stops 29 preventing movement thereof beyond the peripheries of discs 26. The absence of interconnecting parts between the vanes makes this embodiment lighter and more satisfactory for some purposes than the one shown in Figs. 1-4, though it is not quite so stable and the independent movement of the vanes may at times tend to unbalance the device due to one of the vanes moving outwardly more than another if the weights 27 are not accurately balanced and the elasticity of the vanes themselves is not uniform.

In the third form of the invention the shaft 9 is shown as supported by a frame 30.

It will be understood that the above description and accompanying drawings comprehend only the general and preferred embodiment of my invention, and that various changes in construction, proportion and arrangement of parts may be made within the scope of the appended claims without sacrificing any of the advantages of my invention.

The invention described herein may be manufactured and used by or for the Government of the United States of America for governmental purposes without the payment to me of any royalties thereon.

I claim:

An air motor, comprising a pair of discs rotatably mounted and spaced apart, a pair of curved vanes pivoted to the said discs intermediate the ends of said vanes nearer to the radially outer end than to the radially inner end and the said inner end being adapted to lie adjacent the center of said discs and form in effect a continuous wall across the space between said discs when not in operation or when running at low speeds, a yoke fixed on each of the pivots whereon said vanes are mounted, links interconnecting the ends of said yokes, and a contractile spring having one end fixed to a disc and the other end connected to said yoke and link structure to constrain said ends of the vanes to lie adjacent the center.

ROSS GUNN.